United States Patent
Hackl

(10) Patent No.: US 8,523,552 B2
(45) Date of Patent: Sep. 3, 2013

(54) DEVICE AND METHOD FOR COOLING AN EXTRUDED PLASTIC PROFILE

(75) Inventor: Leopold Hackl, Katzelsdorf (AT)

(73) Assignee: Battenfeld-Cincinnati Austria GmbH, Vienna (AT)

(*) Notice: Subject to any disclaimer, the term of this patent is extended or adjusted under 35 U.S.C. 154(b) by 351 days.

(21) Appl. No.: 12/677,425

(22) PCT Filed: Oct. 17, 2008

(86) PCT No.: PCT/EP2008/064082
§ 371 (c)(1),
(2), (4) Date: Jun. 9, 2010

(87) PCT Pub. No.: WO2009/053320
PCT Pub. Date: Apr. 30, 2009

(65) Prior Publication Data
US 2010/0301526 A1 Dec. 2, 2010

(30) Foreign Application Priority Data
Oct. 22, 2007 (DE) .......................... 10 2007 050 291

(51) Int. Cl.
*B29C 47/48* (2006.01)
(52) U.S. Cl.
USPC .................. 425/133.1; 425/376.1; 425/378.1
(58) Field of Classification Search
USPC ................................. 425/133.1, 376.1, 378.1
See application file for complete search history.

(56) References Cited

U.S. PATENT DOCUMENTS

| 3,635,624 | A | | 1/1972 | Nakakoshi et al. |
| 3,649,143 | A | * | 3/1972 | Papesh et al. ............... 425/133.1 |
| 3,856,448 | A | * | 12/1974 | Iijima et al. ................ 425/133.1 |
| 3,907,961 | A | | 9/1975 | Carrow |
| 4,484,883 | A | | 11/1984 | Honda et al. |
| 2009/0174107 | A1 | * | 7/2009 | Kossl ............................ 264/167 |

FOREIGN PATENT DOCUMENTS

| DE | 1952 329 | 7/1970 |
| DE | 93 01 353.1 | 2/1994 |

(Continued)

OTHER PUBLICATIONS

International Search Report of PCT/EP2008/064082, mailed on May 8, 2009.

*Primary Examiner* — James Sanders
(74) *Attorney, Agent, or Firm* — Hamilton, Brook, Smith & Reynolds, P.C.

(57) ABSTRACT

The invention relates to a device for extruding plastic profiles, preferably plastic tubes, to which plasticized bulk plastic can be fed, and comprising a plurality of ring channels (5) combined by means of a flow conjunction (4) to a common melt channel (2). According to the invention, the tool (1) is divided into three functional areas, wherein the three functional areas are a distribution area (7), a cooling area (8), and a forming area (9), wherein cooling channels (3) are disposed about the ring channels (5) in the cooling area (8). The invention further relates to a method for extruding plastic profiles, preferably plastic tubes, comprising the following steps: a) feeding bulk plastic from one or more extruders into one or more infeed channels (6), b) wherein the fed bulk plastic is divided into partial flows in a distribution area (7), c) transport of the bulk plastic into at least two ring channels (5) located in a cooling area (8) of the tool (1), d) cooling the bulk plastic by means of cooling channels (3) disposed around the ring channels (5), e) joining the pre-cooled partial flows at a flow conjunction (4) to form an overall melt flow in a melt channel (2), f) forming the desired plastic product, g) feeding the formed plastic product into a cooling and calibrating station.

3 Claims, 2 Drawing Sheets

(56) References Cited

FOREIGN PATENT DOCUMENTS

Figure 1:
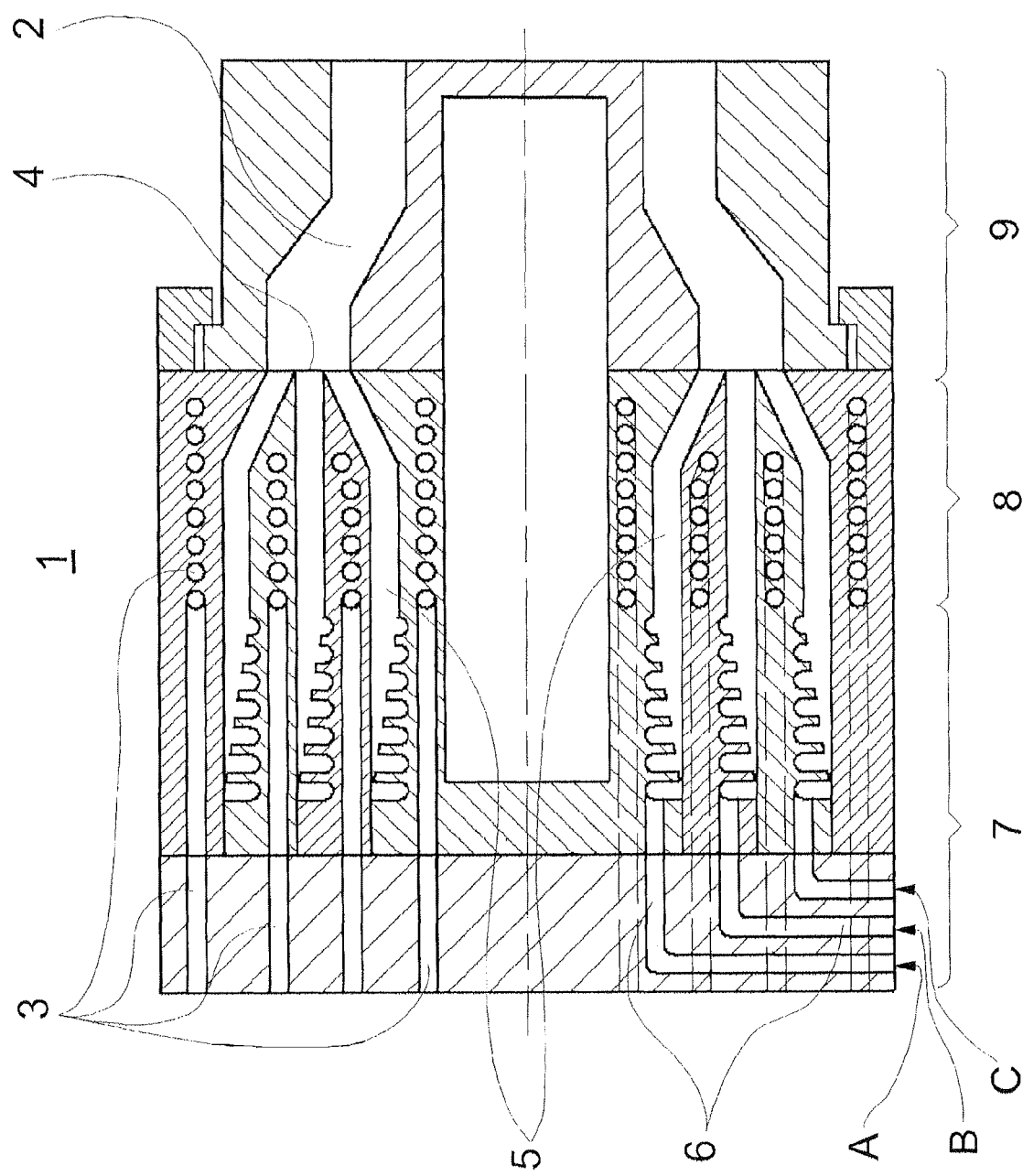

| | | |
|---|---|---|
| DE | 199 46 689 A1 | 4/2000 |
| DE | 102005031747 A1 | 11/2007 |
| EP | 595038 | 5/1994 |
| JP | 56005750 A | 1/1981 |
| JP | 61 134220 | 6/1986 |
| JP | 62060626 A | 3/1987 |
| WO | WO 2006/050549 | 5/2006 |

* cited by examiner

DEVICE AND METHOD FOR COOLING AN EXTRUDED PLASTIC PROFILE

This application is the U.S. National Stage of International Application No. PCT/EP2008/064082, filed Oct. 17, 2008, which designates the U.S., is published in German, and claims priority under 35 U.S.C. §§119 or 365(c) to German Application No. 10 2007 050 291.7, filed Oct. 22, 2007.

The invention relates to a device for extruding plastics profiles, preferably plastics pipes, to which plasticated plastics compound can be fed and which has a number of annular channels which are brought together by means of a flow converging location to form a joint melt channel.

The invention also relates to a related method.

To produce pipes, plastics material is melted in an extruder and forced through a corresponding die. In a subsequent calibrating unit, the outer diameter produced in this way is frozen in and the heat is extracted from the plastics material via the outer surface in water spray baths or baths filled with water. In this case, the entire heat must be conducted through the wall of plastics material to the outside, where it is then carried away by the cooling water. With increasing pipe wall thickness, the cooling length becomes disproportionately longer, since the plastics material is a poor heat conductor. Added to this is the fact that the temperature inside the pipe remains at a high level for a long time and the plastics material has sufficient time to trickle down under gravitational force. The consequence is that the pipe wall thickness is always less in the upper region than in the lower region.

Therefore, with increasing pipe wall thickness, this process has two disadvantages. The cooling length becomes disproportionately longer and the plastics material trickles down the inner wall, with the consequence of uneven wall thickness distribution. In order to reduce these disadvantages, a number of systems of internal pipe cooling are known, such as from EP 795 389. However, these systems are very limited in how they operate. Since the pipe is cooled both on the outside and on the inside, both the outer contour and the inner contour are frozen in. If the melt in the middle of the pipe wall solidifies by heat dissipation to the outside and the inside, the great reduction in volume during the transition from the molten state into the solid state causes voids to occur. This risk becomes greater with greater pipe wall thicknesses.

A device for the extrusion of plastics profiles to which plasticated plastics compound can be fed and which has a number of annular channels which are brought together to form a common melt channel is known from JP 56-005 750 A. Arranged around these annular channels are cooling channels.

A method for the internal cooling of hollow plastics profiles and an extruder for producing hollow plastics profiles are known from DE 10 2005 031 747 A1. The internal cooling is achieved here by a cooling gas being made to enter the interior space of the hollow profile, the cooling gas being produced in a Ranque vortex tube.

The object of the present invention is to provide a device and a method with which the heat can be removed as uniformly as possible over the entire wall thickness of the pipe.

This object is achieved by a device according to the preamble of claim 1 in that the die is divided into three functional regions, the three functional regions comprising a distributing region, a cooling region and a shaping region, cooling channels being arranged around the annular channels in the cooling region.

Therefore, the melt strand coming from the extruder is divided in the distributing region among a number of annular channels, it being possible for the number of annular channels to vary according to the pipe wall thickness. Even before the actual pipe is extruded, a proportion of heat is extracted from the plastics melt.

The annular channels are advantageously of a concentric configuration, it being provided that at least the relative distance between the annular channels is to the greatest extent the same. This is advisable in order that the existing mass of the die, for example of the steel, is likewise to the greatest extent the same, and consequently there is not different heat conduction between the individual annular channels. With this configuration it can be ensured that relatively uniform cooling acts on the plastics compound.

Each of the feed channels in the distributing region may be assigned an extruder, whereby multilayer pipes can be produced in an extremely simple way. Different materials or the same materials may be provided in the extruders.

The object in terms of the method is achieved by the following steps being performed: a) feeding plastics compound from one or more extruders into one or more feed channels, b) the fed plastics compound being divided in a distributing region into partial streams, c) passing the plastics compound on into at least two annular channels, which are in a cooling region of the die, d) cooling the plastics compounds by means of cooling channels arranged around the annular channels, e) bringing the pre-cooled partial streams together at a flow converging location to form an overall melt stream in a melt channel, f) forming the desired plastics product, g) feeding the formed plastics product to a cooling and calibrating station.

Heat is extracted from the partial streams in the annular channels by means of the cooling channels. As already mentioned above, a large part of the heat that has necessarily been introduced during the plastication can in this way be extracted from the very hot plastics compound before the actual plastics profile is produced.

However, it is important in this respect that only so much heat is extracted in the partial streams that the fed plastics compound still forms a homogeneous mass in the overall melt stream. If too much heat is extracted from the plastics compound and an outer skin already forms in the annular channels, a multilayered pipe which sticks together at the surfaces would be obtained.

According to a development, it is therefore provided that means are used to control and/or regulate the heat extraction in the partial streams. The regulation or control may be performed directly in conjunction with the machine control, so that if the temperature in the melt strand goes below a minimum temperature, the cooling in the partial streams is immediately reduced. It is even conceivable here to monitor the temperature of the overall melt stream in the melt channel and to integrate it in the regulation or control.

With the proposed method or the proposed device, it is possible, in particular in the case of thick-walled pipes, to extract heat from the melt already in the die and thereby reduce the cooling zone and improve the quality of the product.

Figure 2:
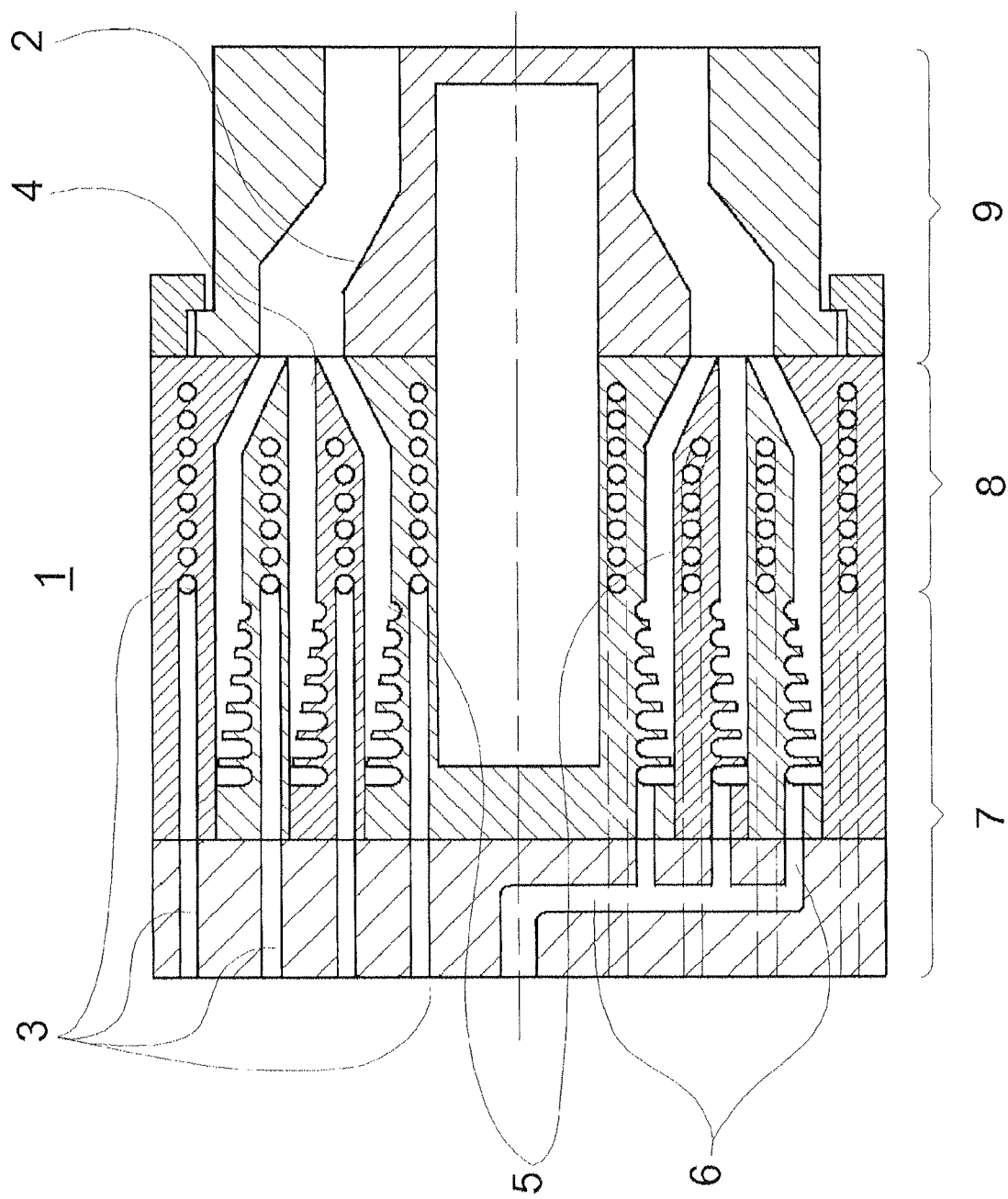

Two exemplary embodiments of the invention are schematically represented in the drawings, in which FIG. 1 shows a section through the die and FIG. 2 shows the subject matter according to FIG. 1 in an alternative configuration.

In FIG. 1, a die 1 according to the invention is represented. The actual melt channel 2, by means of which the plastics profile is extruded, forms the final part of a complete die. The middle part of the die 1 comprises a number of annular channels 5, which come together at a flow converging location 4 and form the beginning of the joint melt channel 2. The individual annular channels 5, which are in connection with feed channels 6, are fed plasticated plastics compound from an extruder (not represented). Arranged between the annular channels 5 are cooling channels 3, which are in connection with a cooling circuit (likewise not represented). The cooling channels are arranged in such a way that they can extract heat from the existing material mass of the die as uniformly as possible. The die is consequently divided into the three functional regions: the distributing region 7, at which the melt is fed to the feed channels 6 from the extruder or extruders at the locations A, B, C and distributed among the annular channels 5, the cooling region 8, in which the annular channels 6 are provided with cooling channels 3, and the shaping region 9, in which the pre-cooled melt flows together.

In FIG. 2, an alternative configuration of the invention is represented. It differs from the configuration according to FIG. 1 in that the feeding of the melt takes place centrally, that is to say only by means of one extruder. It consequently shows a section through the die 1 in which the actual melt channel 2 by means of which the plastics profile is extruded can again be seen. Here, too, it forms the final part of a complete die. Here, too, the middle part of the die 1 comprises a number of annular channels 5, which are brought together at the flow converging location 4 and form the beginning of the joint melt channel 2. The individual annular channels 5 are in connection with the feed channels 6. It can clearly be seen that the feed channels 6 are supplied centrally with a flow from an extruder that is not represented and the flow is then divided among the three spiral mandrel distributors. Here, too, arranged between the annular channels 5 are cooling channels 3, which are in connection with a cooling circuit (likewise not represented). It goes without saying that the cooling channels are again arranged in such a way that they can extract heat as uniformly as possible from the existing material mass of the die. Here, too, the die 1 is divided into the three functional regions: the distributing region 7, the cooling region 8 and the shaping region 9.

It should be noted that, both according to the configuration as shown in FIG. 1 and according to the configuration as shown in FIG. 2, one and the same plastics compound or different plastics compounds may be applied to each annular channel 5. To do so, all that is necessary is to modify the feed channel 6 in such a way that, for example, each feed channel is assigned an extruder of its own. In this way, for example, layers of different colors can be produced in the pipe or else two materials with different properties can be produced. It is consequently possible, for example, to apply a recycled material to the middle part, which in the finished part is then enclosed on both sides by high-quality material.

With the proposed method and the proposed device, it is consequently possible in a simplified manner to remove heat uniformly over the entire wall thickness of the pipe.

LIST OR DESIGNATIONS

1 Die
2 Melt channel
3 Cooling channel
4 Flow converging location
5 Annular channel
6 Feed channel to 5
7 Distributing region of 1
8 Cooling region of 1
9 Shaping region of 1

The invention claimed is:

1. A device for extruding plastic profiles, preferably plastic pipes, to which plasticated plastic compound can be fed and which has a number of annular channels which are brought together by means of a flow converging location to form a joint melt channel,
the die is divided into three functional regions, the three functional regions comprising a distributing region,
a cooling region and
a shaping region,
the annular channels being arranged in a concentric configuration in the distributing region and the cooling region with the die being configured with material mass of the die located between the annular channels being to the greatest extent the same, such that there is similar heat conduction between the individual annular channels,
the annular channels in the distributing region including protrusions which decrease in height in the downstream direction until smoothing out at the start of the cooling region, cooling channels running axially by the protrusions in the distributing region and being arranged around and between the annular channels in the cooling region in a manner to extract heat from the mass of the die generally uniformly, for providing relatively uniform cooling on the plastic compound.

2. The device as claimed in claim 1 in which the relative distance between the annular channels is to the greatest extent the same.

3. The device as claimed in claim 1 in which each feed channel in the distributing region is assigned an extruder.

* * * * *

UNITED STATES PATENT AND TRADEMARK OFFICE
CERTIFICATE OF CORRECTION

PATENT NO. : 8,523,552 B2  Page 1 of 1
APPLICATION NO. : 12/677425
DATED : September 3, 2013
INVENTOR(S) : Leopold Hackl It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 491 days.

Signed and Sealed this

Fifteenth Day of September, 2015

Michelle K. Lee
*Director of the United States Patent and Trademark Office*